117729 PATENTED AUG 8 1871
J. N. Bebout. Rafter Hook.
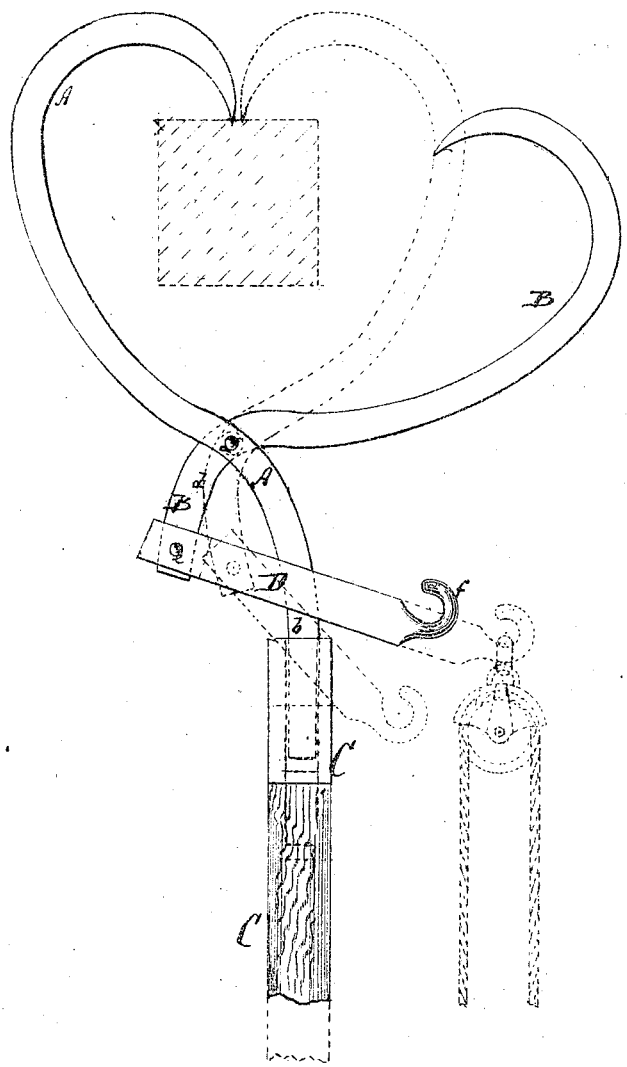
Witnesses:
P. C. Dieterich
Wm. H. C. Smith
Inventor:
J. N. Bebout
per
Attorneys.

UNITED STATES PATENT OFFICE.

JOHN NEWTON BEBOUT, OF OBERLIN, OHIO.

IMPROVEMENT IN RAFTER-HOOKS.

Specification forming part of Letters Patent No. 117,729, dated August 8, 1871.

*To all whom it may concern:*

Be it known that I, JOHN NEWTON BEBOUT, of Oberlin, in the county of Lorain and State of Ohio, have invented a new and Improved Rafter-Hook; and I do hereby declare that the following is a full, clear, and exact description thereof, which will enable others skilled in the art to make and use the same, reference being had to the accompanying drawing forming part of this specification, in which the drawing represents a side view of my improved rafter-hook.

This invention relates to a new rafter-hook which remains under complete control while being applied, one part being connected with the supporting-stem, while the other has a pivoted hook that carries the pulley and rope. The invention consists in the general arrangement of parts, whereby the desired result is obtained, as hereinafter more fully described.

A and B in the drawing are the two parts of the clutch, pivoted together at $a$ in the usual manner. The shank $b$ of A is extended to fit a socket at the end of a pole, C. To the shank $d$ of the other part B is pivoted at $e$ a forked lever, D, straddling the shank $b$ and having a hook, $f$, at the outer end. To this hook $f$ is hung the pulley which carries the hoisting and lowering rope.

The device is applied as follows: The hook of A is first fitted over the rafter by means of the pole, while the clutch is open, as shown by full lines in the drawing. Then the rope is pulled to draw the hook $f$ down and close the clutch over the rafter, as shown by dotted lines; and, finally, the pole is removed, when the lever D will swing close against the shank $b$, as is also indicated. The clutch is thus under complete control while being applied.

Having thus described my invention, I claim as new and desire to secure by Letters Patent—

In combination with a long-shanked pole-hook, A, and a short-shanked clutch-hook, B, which rests on top of the beam, the lever D, bifurcated to straddle the shank of the former, pivoted to the shank of the latter at $e$, and having pulley-hook $f$ on the outer end thereof, as and for the purpose specified.

JOHN NEWTON BEBOUT.

Witnesses:
H. T. TANNER,
N. T. TOWNSEND.